United States Patent

[11] 3,634,880

[72] Inventor William J. Hawkins
North Brunswick, N.J.
[21] Appl. No. 39,009
[22] Filed May 20, 1970
[45] Patented Jan. 11, 1972
[73] Assignee Popular Science Publishing Company, Inc.
New York, N.Y.

[54] AUTOMOBILE ANTITHEFT APPARATUS
9 Claims, 3 Drawing Figs.
[52] U.S. Cl. ................................................. 340/63,
123/146.5 B, 180/114, 200/46
[51] Int. Cl. ...................................................... B60r 25/04
[50] Field of Search............................................ 340/63, 64,
276; 180/114; 307/10 AT; 200/43, 46; 123/146.5 B

[56] References Cited
UNITED STATES PATENTS
2,843,843 7/1958 Davis............................ 340/63
3,513,466 5/1970 Isaacs et al.................... 340/63

3,544,804 12/1970 Gaumer et al. ............... 180/114

Primary Examiner—Donald J. Yusko
Assistant Examiner—Glen R. Swann, III
Attorney—Christie, Parker & Hale ABSTRACT: Electronic means for preventing theft of an automobile or similar vehicle is provided wherein the vehicle is operated by a punchcard or other similar arrangement for operating a plurality of switch closures. A selected pattern of switch closures operated for a first card enables operation of all vehicle functions. A second pattern of switch closures selectively operable by a second card operates only the ignition and starter, permitting limited automobile operation, such as, for example, by a parking attendant. The two patterns or codes are mutually exclusive in operation, and means are provided for switching from the first code to the second code only when the card for the first code is in active use. Means are also provided for switching from the second code to the first code when the owner wishes to operate the entire vehicle again, and automatically if tampering with vehicle systems is attempted.

PATENTED JAN 11 1972

INVENTOR
WILLIAM J. HAWKINS

BY
Christie, Parker, & Hale
ATTORNEYS

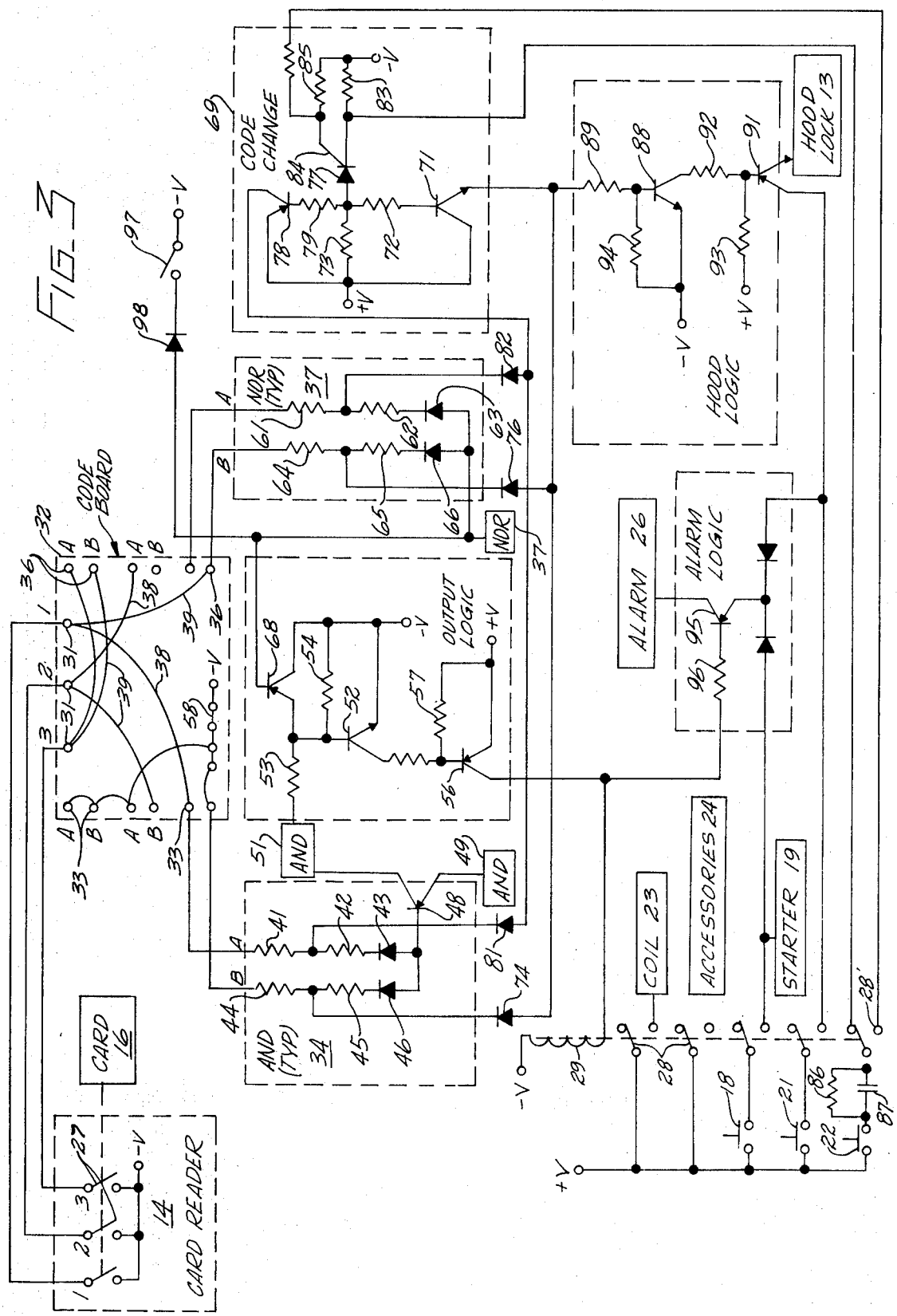

AUTOMOBILE ANTITHEFT APPARATUS

BACKGROUND

Automobile theft has become a significant social and economic problem in this country, in some part because of the operating mechanisms that are employed for controlling access to the vehicle. Typically, keylocks are employed for operating switches for controlling vehicle ignition and the like. Various electrical connections are available under the dashboard of the vehicle within reach of a potential thief, and electrical avoidance of the conventional ignition systems is readily achieved by a skilled thief. In conventional automobiles, the thief also has access to the electrical system under the vehicle's hood, and the ignition-locking system can be circumvented from that location if desired. With conventional key systems there are a limited number of tumbler combinations employed, and master key arrangements are sometimes available so that with a limited stock of keys a thief can steal virtually any automobile quickly without resorting to the changing of electrical connections.

In order to minimize the enormous economic losses due to automobile theft, it is desirable to provide a system that effectively prevents theft by removing the locking control functions of the vehicle from the dashboard area to an area beneath the hood, and providing a hood lock operable only by persons having authorized access to the area beneath the hood. A keying arrangement having a large number of possible combinations that are not determinable from the vehicle dashboard is also desirable for minimizing the possibility of electronic "lock-picking." The avoidance of "master key" access to vehicles in the hands of individuals is desirable; however, it is also desirable to provide a temporary master key arrangement available to manufacturers and dealers for minimizing the number of keys required for large fleets. It is, therefore, desirable to employ a system by which the keying arrangement can be changed readily as desired.

BRIEF SUMMARY OF THE INVENTION

Thus, in practice of this invention according to a preferred embodiment there is provided an automobile antitheft apparatus comprising means for sensing a selected key code pattern, means for identifying a first code pattern and a second code pattern from the means for sensing, means for operating the vehicle in response to the means for identifying the first code pattern, means for operating only a portion of vehicle functions in response to the means for identifying a second code pattern, and means for selecting which of the first and second code patterns is operable to the exclusion of the other code pattern.

DRAWINGS

These and other features and advantages of the present invention will be appreciated by reference to the following detailed description of a presently preferred embodiment when considered in connection with the accompanying drawings, wherein:

FIG. 3 illustrates in circuit form details of the apparatus of FIG. 2.

Throughout the drawings like numerals refer to like parts.

DESCRIPTION

Figure 1:
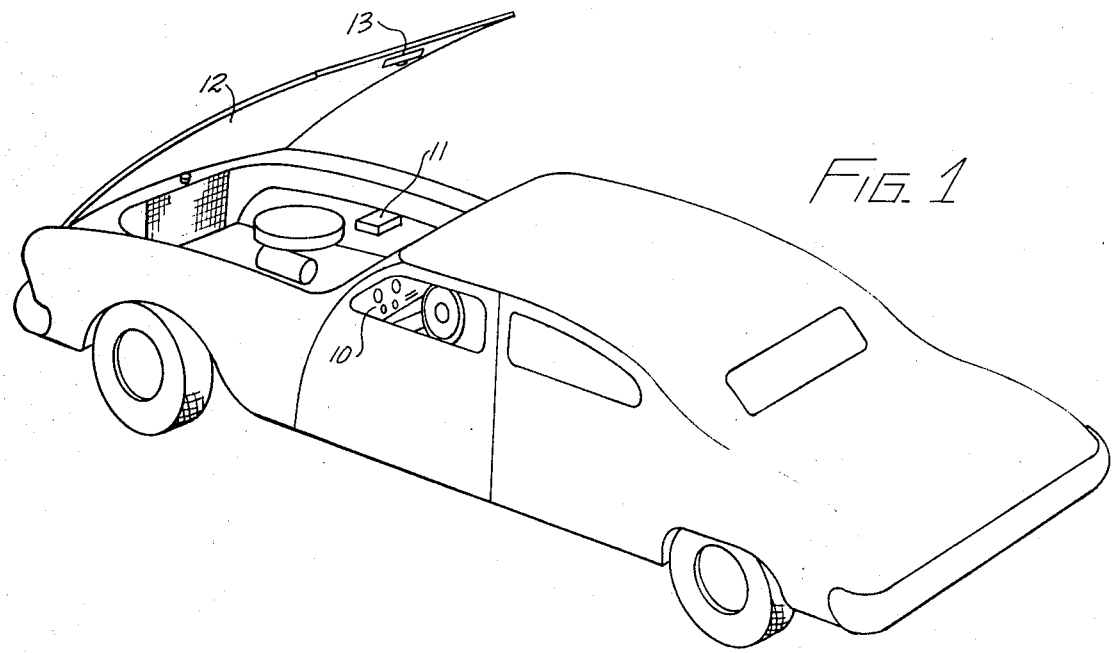
FIG. 1 illustrates a vehicle incorporating principles of this invention.

FIG. 1 illustrates a typical automobile representative of vehicles that may be protected according to principles of this invention. As illustrated in this embodiment, the automobile is equipped with an antitheft apparatus having a driver control unit 10 mounted on the automobile dashboard. The driver control unit 10 is electrically connected to a control logic arrangement 11 mounted at some convenient location beneath the vehicle hood 12. Both the control unit and the control logic are small and can be provided on a vehicle with no significant modification of the vehicle. Such units can be provided as original equipment by the automobile manufacturer, or can be provided at some later time by a vehicle owner as may be desired. The vehicle hood 12 is preferably provided with a conventional electrically operated lock 13 operated, for example, by a solenoid or the like. Thus, when the hood is closed it is locked electrically and can be opened only by one having the appropriate electrical control; rather than having a mere mechanical latch as is customarily provided on present automobiles.

Figure 2:
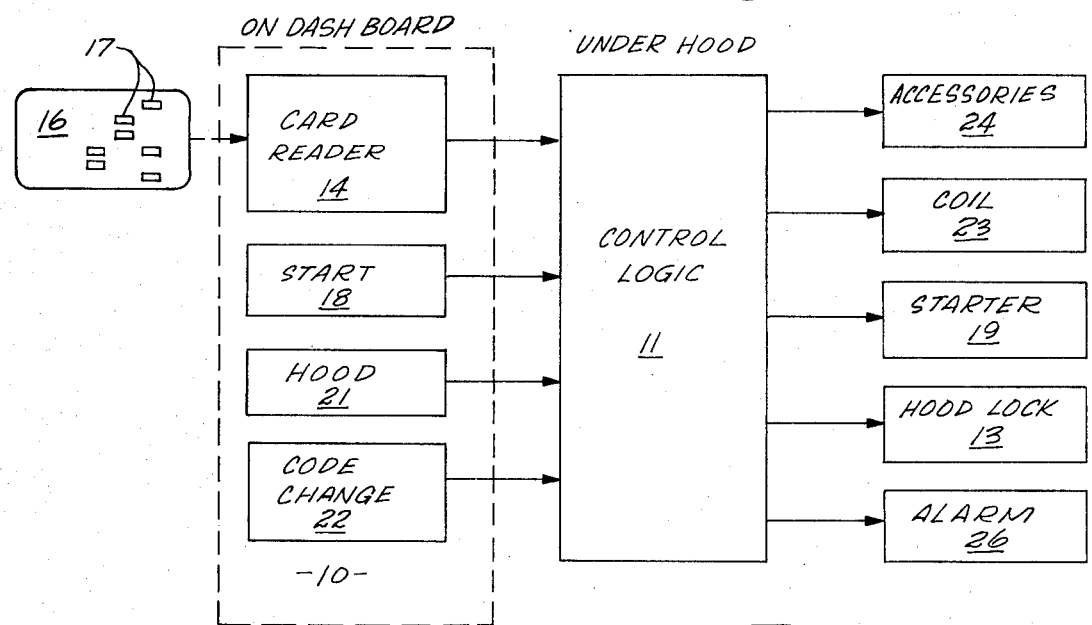
FIG. 2 illustrates in block form an automobile antitheft apparatus constructed according to principles of this invention.

FIG. 2 illustrates in block diagram form additional details of the control system. As illustrated in this arrangement, the driver control unit 10 comprises a conventional card reader 14 into which the operator may insert a punchcard 16 in order to operate the vehicle. In the preferred embodiment provided in practice of this invention, the card 16 is a conventional punchcard having a pattern of perforations 17 in a selected arrangement or code. The card reader 14 in such an arrangement senses the presence and absence of holes in particular portions of the card and operates switches in response thereto, all according to conventional practice. It will be apparent to one skilled in the art that in lieu of using a punchcard with a plurality of holes 17 the card may have a pattern of raised areas, a pattern of magnetic areas, or a pattern of electrically conductive areas, any of which may be employed for operating conventional card-reading mechanisms for identifying a selected pattern of indicia on the card. It will also be appreciated that although the present embodiment is set forth as a card and card-reading arrangement that cylinders or other geometric arrangements of devices having switch-operating indicia can be employed with suitable reading mechanisms. Many such arrangements are presently available and the details of such a structure are of no particular significance in practice of this invention.

The driver control unit 10 on the vehicle dashboard also includes a start switch 18 for operating the electric starter 19 of the automobile when the control logic 11 permits. An ordinary pushbutton can be employed for the start switch 18. In a like manner, a hood release switch 21 is also provided in the driver control unit 10 so that the electrical hood lock 13 can be operated from the dashboard when the control logic 11 permits. A code change switch 22, the function of which is set forth in greater detail hereinafter, is also provided on the driver control unit 10 on the vehicle dashboard. Beneath the automobile hood, the control logic 11 provides connections to the hood lock 13 and starter 19 and also to the ignition coil 23 for operation of the vehicle. It is also desirable to provide an electrical connection of way of the control logic to vehicle accessories 24 so that access to accessories within the driver's compartment does not permit circumventing the control system by electrical "hot-wiring." If desired, an alarm 26 can also be connected to the control logic 11 to provide an audible, visible, or radio signal in case of unauthorized tampering with the vehicle control system.

FIG. 3 illustrates in greater detail the electrical arrangements for a vehicle antitheft apparatus constructed according to principles of this invention. As illustrated in this arrangement, the card reader 14 is merely represented as a plurality of switches 27 selectively operable by a card 16. The particular arrangement of switch opening and closing effected by the card in this embodiment is not set forth in any detail. In the illustrated arrangement only three such switches 27 are illustrated, which provides for eight possible code combinations of switch open and closed positions. Of these, at least one is not truly useful, namely, when all switches are open, and, therefore, the number of useful combinations is 2N−1, or seven where N is the number of switches employed. Since the components employed are economical, a large number of switches and associated mechanisms can be employed and N can be 15, 20, or some other convenient number as may be desired to provide a high degree of improbability of an unauthorized card being able to operate a vehicle.

The start switch 18, hood switch 21, and code change switch 22 are each connected between a positive lead from the car battery (not shown) and a respective switch closure or contact 28. The contacts are all mechanically connected as relay contacts operated by a conventional relay coil 29. Actuation of the relay coil 29 by the control system hereinafter described closes all of the relay contacts 28 (illustrated in their open position), thereby connecting power to the ignition coil 23 and accessories 24, and connecting the operating push buttons to their respective controlled functions. (The code change pushbutton 22 also has functional contacts in the "open" position.) The relay is mounted with the control logic beneath the vehicle hood so that tampering beneath the vehicle dashboard cannot effect operation of the various vehicle functions. Thus, for example, the accessories 24 are isolated from the coil 23 by the relay so that tampering with the accessories cannot be employed for operating the ignition from within the driver's compartment.

The switches 27 of the card reader 14 are each electrically connected to one of a plurality of terminals or leads 31 on a code board 32. Also on the code board 32 are a plurality of AND-terminals 33, each pair of which can be indicated as an A lead and a B lead. Each pair of AND-leads 33 is connected to an AND-gate 34, a typical one of which is illustrated in FIG. 3 and described in greater detail hereinafter.

The code board 32 also includes a plurality of NOR leads or terminals 36, each pair of which can be designated as an A lead and a B lead. Each of the NOR-leads 36 is connected to a NOR-gate 37, only one of which is illustrated in FIG. 3 and described in greater detail hereinafter. There are as many pairs of AND-leads 33 as there are pairs of NOR-leads 36, and as many as there are switches 27 in the card reader 14. Each pair of AND-terminals 33 is connected to its respective AND-gate 34, and each pair of NOR-terminals 36 is connected to its respective NOR-gate 37. Thus, if there are N switches 27 in the card reader there are N pairs of AND-leads 33, N pairs of NOR-leads 36, N AND gates, and N NOR gates, that is, there is a 1 to 1 correspondence between the switches, the AND gates and the NOR gates. Since the switches, leads and gates are substantially identical only a limited number are illustrated in FIG. 3 sufficient to illustrate principles of this invention without unduly multiplying the description.

Each of the switch terminals 31 has a wire 38 interconnecting that terminal and one of the A terminals in either an AND-pair 33 or a NOR-pair 36. Thus, for example, the No. 1 switch terminal 31 is connected to an A AND-terminal 33 by a wire 38. Similarly, the No. 2 switch terminal 31 is connected to an A NOR-terminal 36 by a wire 38. The No. 3 switch terminal 31 is connected to another A NOR-terminal 36. All of the switch terminals 31 are thus connected to a corresponding AND or NOR gate at that gate's A terminal. None of the switch terminals 31 are connected to both an AND gate and its corresponding NOR gate at the A terminal.

In substantially the same manner, each of the switch terminals 31 is connected to a B lead or terminal of either an AND-pair 33 or a NOR-pair 37. There is no particular required relation between which switch terminals 31 are connected to AND gates at their A leads and which switch leads 31 are connected to B terminals at the AND gates. The interconnection of switch terminals with selected A leads of AND gates and NOR gates provides a code pattern which can be designated as the A code for vehicle operation. The pattern of switch terminals 31 connected to B leads of selected AND and NOR gates determines a code pattern that can be designated as a B code.

In the illustrated embodiment as will be apparent hereinafter, a pattern of switch closures corresponding to connections to the AND gates enables vehicle operation. Thus, as shown in FIG. 3, the Nos. 1, 2, and 3 switches 27 are connected to AND, NOR and NOR gates, respectively. The vehicle can be operated when switch No. 1, and only switch No. 1, is closed. Using conventional binary notation, the A code can then be expressed as 100, where 1 indicates a switch closure and 0 indicates an open switch. The B code in the illustrated embodiment is therefore 010, and the vehicle can be operated according to the B code when switch No. 2, and only switch No. 2, is closed.

The code board 32 thus provides an A code and a B code determined by the arrangement of wires 38 and 39 interconnecting the various board terminals 31, 33, and 36. Preferably, the code board 32 is made as a wired board, having individual wires 38 and 39 interconnecting the various terminals, and the board is made removable from the apparatus so that if desired an individual board with a selected code can be unplugged and replaced with a different board having a different code. If desired, the code board 32 can be in the form of a conventional printed circuit on an insulating substrate, providing a pattern of conductors between board terminals.

Since the code pattern of wires on the board 32 determines what pattern of indicia 17 on the card 16 will operate the vehicle, changing of the code board changes the arrangement of indicia capable of operating the vehicle. In a way, the electrical interconnections on the code board 32 provide an electrical analog of the tumblers in the conventional key lock. It will be recalled, however, that the code board 32 is mounted in the control logic unit 11 (FIG. 1) beneath the hood of the vehicle, and, with an electrical lock as provided in practice of this invention, unauthorized access to the code board cannot be obtained. A proper code card must be inserted in the card reader before the hood lock can be actuated to provide access to the code board. Such access permits an authorized person to change the code board. Thus, when the vehicle is first manufactured it may be provided with a master code permitting the vehicle to be operated by the manufacturer and dealers without having a large stock of code cards. Similarly, if desired, a fleet user or dealer may provide a single type of code card for all of his vehicles so that one style of card can be used for all. In another application, the changeability of the code card is used to good advantage when a vehicle changes ownership so that previously used cards no longer provide vehicle access.

As mentioned hereinabove, each pair of AND-terminals 33 is connected to an AND-gate 34, a typical one of which is illustrated in FIG. 3. The A-terminal of the AND-pair 33 is connected by way of a pair of resistors 41 and 42 to a diode 43. Similarly, the B lead is connected through a pair of resistors 44 and 45 to a diode 46. The two diodes 43 and 46 are both connected to the base of a PNP-transistor 48. The emitter of the transistor 48 is connected to a prior AND-gate 49 and the collector is connected to a subsequent AND-gate 51. (The other connections to the AND-gates 49 and 51 are deleted but will be understood to be the same as connections to the typical AND-gate 34.) Each AND gate in the system has a single PNP-transistor having its emitter connected to the collector of the transistor in the preceding AND gate (except the first AND gate in which the emitter is connected to the positive battery terminal). Thus, all of the AND gates are in series and all of the transistors must be conductive in order for current to flow in the system, that is, all of the AND gates are "ON."

The No. 1 switch 27 in the card reader 14 is connected to the negative terminal of the battery and is also connected by way of the No. 1 switch lead 31, wire 38, A AND-terminal 33, resistors 41 and 42 and diode 43 to the base of the transistor 48. Thus, if the No. 1 switch of the card reader is closed there is a negative bias on the base of the transistor, causing it to conduct. If the No. 1 switch is open there is no negative bias on the transistor base (when the A code is in operation as hereinafter explained), the transistor 48 is nonconductive, and the serial chain of AND gates is broken.

The collector of the final AND-gate 51 is coupled to the base of an output NPN-transistor 52 by a resistor 53. The emitter of the output transistor 52 is connected to the negative battery lead and the base is appropriately biased by a resistor 54 to be nonconductive when any of the AND gates is off. The collector of the output NPN-transistor 52 is coupled to the base of an output PNP-transistor 56, the emitter of which is connected to the positive battery lead. A resistor 57 normally biases the base of the output PNP-transistor 56 to prevent conduction. The collector of the output PNP-transistor 56 is connected to the coil 29 of the relay for operation thereof.

If the serially connected AND-gates 49, 44 and 51 are all conductive, the bias voltage on the base of the output NPN-transistor 52 rises causing conduction, thereby dropping the bias voltage on the base of the output PNP-transistor 56. The resultant conduction of the output transistor 56 operates the relay, thereby closing the switch contacts 28 and permitting vehicle operation.

Since all of the AND gates must be conductive in order for the vehicle to be operated, a negative voltage common bus 58 is connected to all of the AND-leads 33 on the code board 32 that are not connected to a switch terminal 31. However, if this were the only code connection provided, the AND gates could not distinguish whether they were connected to the common bus 58 or to a closed switch in the card reader, and the code system could be readily circumvented by merely closing all of the switches in the card reader.

The NOR-gates 37 effectively connected in parallel with each other to the pairs of NOR-terminals 36 provide a means for detecting when a switch 27 is improperly closed.

In the typical NOR-gate 37 illustrated in FIG. 3, the A terminal of a NOR-pair 36 is connected by way of a pair of resistors 61 and 62 to a diode 63. Similarly, the B lead of the same pair of NOR-leads 36 is connected by a pair of resistors 64 and 65 to a diode 66. The two diodes 63 and 66 are both connected along with corresponding diodes of the other NOR-gates 37 to the base of a control PNP-transistor 68 in the output logic. The NOR gates are therefore effectively in parallel. The emitter of the control transistor 68 is, along with the AND gates, connected to the base of the output NPN-transistor 52, and the collector is connected to the negative battery lead. The control transistor 68 is normally nonconductive.

Assuming that the B lead has been selected for vehicle operation in a manner hereinafter described, closure of the No. 1 switch 27 in the card reader 14 is not in accordance with the 010 B lead and would indicate an attempt to use the vehicle with the wrong card. Unauthorized vehicle usage is prevented because of the connection of the No. 1 switch terminal 31 to the B lead of the NOR-pair 36 which, if the No. 1 switch is closed, drops the bias on the base of control transistor 68. Conduction of the control transistor 68 effectively shorts the AND gate output to the negative lead of the battery around the bias resistor 54, thereby preventing conduction of the output transistors 52 and 57 and preventing relay closure.

Thus, in this example if the B code is selected, and the No. 1 switch is closed, the relay is inactivated and the vehicle cannot be operated. If the B code has been selected and all of the switches are closed, the connection to the NOR-gate 37 senses the improper closure of the switches connected to the NOR gates and prevents vehicle operation. If any of the switches 27 connected to a NOR gate is closed, this will prevent vehicle operation since all are in parallel. Thus, it will be seen that in order for the vehicle to be operated, all of the switches 27 connected to AND gates for a selected code must be closed, and none of the switches 27 connected to a NOR gate can be closed.

In a normal situation when the vehicle owner is operating the vehicle, the A code is selected so that all of the vehicle functions are available to him. When the A code is selected, means are provided in code change logic 69 for disabling or negating the B code. This is accomplished by way of an NPN-transistor 71 having its collector connected to the positive battery lead and also having its base connected to the positive battery lead by way of resistors 72 and 73. The emitter of the code change NPN-transistor 71 is connected by way of a diode 74 to a point between the resistors 44 and 45 in the AND-gate 34. The emitter is also connected by way of a diode 76 to a point between the resistors 64 and 65 in the NOR-gate 37. The effect in each of these two gates 34 and 37 is the same.

If the B-lead should be connected to the negative lead, such as, for example, by the common bus 58 connected to the AND-gate 34, the NPN-transistor 71 is forwardly biased and hence conductive. This raises the voltage at the point between the two AND-resistors 44 and 45 to that of the positive battery lead. The increased voltage at this point makes the base of the AND-transistor 48 substantially insensitive to any B terminal contact with the negative battery lead by way of either the common bus 58 or a switch 27 in the card reader. In effect the B input to the gates is shunted and the response of the AND and NOR gates is thus determined solely by the connections to the A terminals on the code board 32.

When the vehicle owner wishes to provide access to limited vehicle functions, such as, for example, starting and driving the vehicle without access to the hood, he can switch from the A code which provides access to the entire vehicle to the B code which, for example, permits starting and driving but prevents opening of the hood lock, as pointed out in detail hereinafter.

The base of the code change NPN-transistor 71 is connected by way of the resistor 72 to the positive side of a silicon-controlled rectifier (SCR) 77. The positive side of the SCR is also connected to the base of a code change PNP-transistor 78 by a resistor 79. The emitter of the code change PNP-transistor 78 is connected to the positive voltage battery lead. Its collector is connected to the point between the resistors 41 and 42 of the AND-gate 34 by a diode 81, and is connected to a point between the resistor 61 and 62 of the NOR-gate 37 by a diode 82. It will be apparent that conduction of the code change PNP-transistor 78 negates the A code in the same manner that conduction of the transistor 71 negates the B code. In the "normal" situation where the A code is selected, the base of the PNP-transistor 78 is connected to the positive voltage by resistors 73 and 79, and the bias thus prevents conduction, thereby permitting the gates 34 and 37 to be responsive to switches 27 connected to the A-terminals 33 and 36, respectively.

The SCR 77 is connected to the negative battery terminal by a resistor 83 which serves to prevent excess current flow when the SCR is conductive. The control lead 84 of the SCR is also connected to the negative lead by a limiting resistor 85. The SCR control lead is also coupled to the normally open contact 28' of the relay associated with the code change pushbutton 22. A pulse-sharpening network of a resistor 86 and capacitor 87 is provided in combination with the code change pushbutton. This RC network provides a fast rise time, short pulse in response to the pushbutton 22 for switching the SCR. The RC network has a time constant sufficiently faster than the time constant of movement of the mechanical relay to prevent oscillation of the relay at the time of code changing.

When the code change logic 69 is in the A code state, that is, with the SCR nonconductive, and a card-containing indicia in the pattern of the A code is in place in the card reader, the relay contacts 28' are closed (opposite to the position illustrated). If the code change pushbutton 22 is pressed at this time, a fast pulse shaped by the RC network 86 and 87 is applied to the control lead 84 of the SCR 77. This switches the SCR so that it is conductive and the bases of the code change transistors 71 and 78 are connected to the negative battery terminal by way of the limiting resistor 83. This change in bias on the code change transistors switches off the NPN-transistor 71 and switches on the PNP-transistor 78. The resultant positive voltage on the A side of the AND and NOR gates makes these gates insensitive to any switch closures connected to the A terminals. At the same time, the plus voltage on the B side of the AND and NOR gates disappears and these gates are sensitive to switch closures connected to the B terminals of the code board 32. In this state, a card having the A code is no longer operable in the vehicle, and only a card having the B code is effective for operating it.

In order to switch from the B code back to the A code, it is only necessary to press the code change pushbutton 22 when the relay is open, that is, in the position illustrated in FIG. 3. This applies a positive pulse to the current lead of the SCR 77, thereby decreasing the voltage drop across the SCR and switching it off, thereby causing the system to revert to the A code state. It should be noted that when the code change logic 69 is in the B state that removal of the positive battery lead or shorting of the lead to ground also reduces the voltage drop across the SCR and switches it back to the A state. This provides a further assurance that the vehicle cannot be tampered with to enable unauthorized use.

In order to permit access to the hood when the code change logic 69 is in the A state, the emitter of the code change NPN-transistor 71 that negates the B state is also coupled to the base of a hood logic NPN-transistor 88 by a resistor 89. In the A state there is a positive signal on the emitter of the code change transistor 71 and, hence, a forward bias on the hood logic NPN-transistor 88 causing its conduction. The collector of the hood logic NPN-transistor 88 is coupled to the base of a hood logic PNP-transistor 91 by a resistor 92. The base is also coupled to the positive battery lead by a resistor 93. When the hood logic NPN-transistor 88 is conductive the hood logic PNP-resistor 91 is forwardly biased and therefore conductive so that operation of the hood lock pushbutton 21 enables operation of the solenoid of the hood lock 13.

When the code change logic 69 is in the B state there is no positive signal on the emitter of the code change NPN-transistor 71, and, hence, the bias on the base of the hood logic NPN-transistor 88 by way of resistor 94 prevents conduction. This also prevents conduction of the PNP-hood logic transistor 91 and renders the hood lock 13 inoperable. The hood lock is, of course, inoperable at any time when there is no card in the card reader since the relay contacts 28 are open.

If desired, in a manner somewhat similar to the hood logic arrangement, logic can be provided in combination with the signal from the coil 23 to enable flashing of the turn signal lights at all times while the vehicle is being driven by use of a B code card. This or some other suitable visual signal can be employed for indicating that the vehicle is being driven by other than the holder of an A code card. Such a signal could, for example, be useful for preventing a parking attendant from employing the vehicle for unauthorized trips when he had authorized access to the vehicle by means of a B card for limited purposes.

If desired, an alarm 26 can be employed for providing a sensible signal, such as, an audible, visible, or radio signal, in case of certain unauthorized tampering with the vehicle. Such an alarm may be connected to the collector of an alarm PNP-transistor 95, the emitter of which is connected to the hood lock and starter connections or other leads that may have a voltage applied thereto during the course of unauthorized use. The base of the alarm transistor 95 is coupled to the collector of the output PNP-transistor 56 by a resistor 96 so that when a signal is applied to close the coil 29 of the relay, the alarm transistor is reverse-biased and the alarm is inoperable. This prevents activation of the alarm when the vehicle is employed by a user having appropriate access that enables closure of the control relay. In the absence of such a signal, the base of the alarm transistor 95 is connected to the negative battery terminal by way of the resistor 96 and the relay coil 29 so that it is forwardly biased and any positive signal appearing on either the starter or the hood lock, for example, will activate the alarm, thereby signaling that there is some unauthorized tampering with the vehicle.

An optional safety feature that may be employed with the antitheft apparatus is a connection by way of diode 98 to the base of the control transistor 68 in the output logic. The diode 96 is, in turn, connected to a switch 97 which can, for example, be coupled to the automobile doors so that the relay is opened and the ignition automatically cut off if a door is opened. If desired, the switch 97 may be a pressure sensitive switch beneath the driver's seat, thereby assuring that the ignition is turned off at all times that the driver is not in position. Although this addition does not have any particular value in preventing theft of the automobile, it is a safety feature readily added to the system since it merely amounts to an additional NOR gate in parallel with the NOR gates operable by the switches of the card reader.

In operation of a vehicle including an antitheft apparatus as provided in practice of this invention, the owner's card key having the A code of indicia allows him full access to the car. He may start it and stop it, or open the hood with the respective buttons. If desired, an electric trunk lock similar to the hood lock can also be provided so that only the owner has access to the trunk. In order to use the car the owner inserts the A card into the card reader and the ignition is thereby turned on. The owner may then press the proper button for the vehicle function he desires, such as, starting, opening the hood, or changing the card code. When the A code card is inserted in the card reader, pressing on the code button immediately turns off the ignition and locks the hood. In this state the A code card will no longer operate the vehicle.

The A card can then be removed and pocketed by the owner and the B card given to a parking lot attendant or the like who may operate the car but cannot open the hood and access to the control logic. In this state, inserting the B card, that is, one having the B code pattern of indicia, will again turn on the ignition and pressing the start button will start the car, but pressing the hood button will have no effect. The attendant may start and stop the vehicle as many times as needed with the B code card. When the owner returns, he merely pushes the code change button again with the ignition off, and the B code card will no longer operate the vehicle, but only the A card will work as before. If a parking lot attendant or the like has made a duplicate of the B card, it does him no good since he would need the A code card belonging to the owner in order to switch the control logic to the B code.

Although but one embodiment of automobile antitheft apparatus constructed according to principles of this invention has been described and illustrated herein, many modifications and variations will be apparent to one skilled in the art. Thus, for example, in lieu of the code change logic employing a silicon-controlled rectifier, a conventional bistable flip-flop can be employed. The code change arrangement illustrated is preferred since the implementation is particularly economical and does not require expensive components. It is also certain of operation in case of tempering, whereas a flip-flop may not switch if, for example, the battery lead is removed. Many other modifications and variations will be apparent to one skilled in the art, and it is therefore to be understood that within the scope of the appended claims the invention may be practiced otherwise than as specifically described.

What is claimed is:

1. A vehicle antitheft apparatus comprising:
   means for sensing a selected key code pattern;
   means for identifying a first code pattern from the means for sensing;
   means for identifying a second code pattern from the means for sensing;
   means for operating the vehicle in response to the means for identifying the first code pattern;
   means for operating only a portion of vehicle functions in response to the means for identifying a second code pattern; and
   means for selecting which of the first or second code patterns is operable to the exclusion of the other code pattern.

2. An apparatus as defined in claim 1 wherein
   the means for sensing comprises a plurality of switch means selectively closable in response to key code indicia; and
   the means for identifying a first code pattern comprises:
      a plurality of AND gates;
      a plurality of NOR gates, there being a 1 to 1 correlation between the AND gates, the NOR gates and the switch means;

means for connecting each of the switch means to either its corresponding AND gate or its corresponding NOR gate in a preselected pattern corresponding to the first code pattern;

means for enabling vehicle operation in response to the AND gates; and means for disabling vehicle operation in response to the NOR gates.

3. Apparatus as defined in claim 2 wherein the means for identifying a second code pattern comprises:

second means for connecting each of the switch means to either its corresponding AND gate or its corresponding NOR gate in a second preselected pattern corresponding to the second code pattern and independent of the first preselected pattern; and wherein the means for selecting comprises:

means for selectively disabling a first portion of each of the AND gates and the NOR gates when the first code pattern is operable, and for disabling a second portion of each of the AND gates and the NOR gates when the second code pattern is operable.

4. A vehicle antitheft apparatus comprising:

card reader means for sensing key code indicia on a vehicle operating card, said card reader means being located in a vehicle driver compartment;

control logic means located in a portion of the vehicle inaccessible from the driver compartment;

switch means located in a portion of the vehicle inaccessible from the driver's compartment for operating the vehicle, said switch means being operable only in response to the control logic means; and lock means for locking the portion of the vehicle containing the control logic means and the switch means;

said control logic means comprising;

means for actuating the switch means in response to a first card code pattern;

means for actuating the switch means in response to a second card code pattern; and means for enabling the lock means to be unlocked only in response to the first card code pattern.

5. A vehicle antitheft apparatus as defined in claim 4 wherein the first card code pattern is mutually exclusive with the second card code pattern and further comprising:

means for switching from the first card code pattern to the second card code pattern only when the first card code pattern is operable.

6. A vehicle antitheft apparatus comprising:

a card reader comprising a plurality of switches selectively closable in response to a pattern of code indicia;

a plurality of AND gates, each of the AND gates having an A input and a B input;

a plurality of NOR gates, each of the NOR gates having an A input and a B input, both the AND gates and the NOR gates bearing a 1 to 1 relation to the switches so that each switch has a corresponding AND gate and a corresponding NOR gate;

means for connecting each of the switches to the A input of its corresponding AND gate or to the A input of its corresponding NOR gate;

means for connecting each of the switches to the B input of its corresponding AND gate or to the B input of its corresponding NOR gate;

first means for selectively disabling the A inputs to the AND gates and the NOR gates;

second means for selectively disabling the B inputs to the AND gates and the NOR gates, operation of the first and second means for disabling being mutually exclusive;

electrically operated switch means for enabling vehicle operation; and means for operating the switch means in response to state of the AND gates and the NOR gates.

7. A vehicle antitheft apparatus as defined in claim 6 further comprising means for preventing access to the antitheft apparatus, except for the card reader, in response to all but a selected pattern of switch closures in the card reader.

8. A vehicle antitheft apparatus as defined in claim 6 wherein the means for selectively disabling comprises:

an NPN-transistor;

a PNP-transistor;

means for selectively applying a positive voltage to the bases of both transistors; and means for connecting the emitter of one of the transistors to the A inputs to the AND gates and the NOR gates, and means for connecting the collector of the other transistor to the B inputs to the AND gates and the NOR gates for selectively disabling the A inputs and B inputs, respectively.

9. A vehicle antitheft apparatus as defined in claim 8 wherein the means for connecting the switches to the AND gates and NOR gates comprises:

a connection board having:

a plurality of switch terminals, a plurality of pairs of AND gate terminals, a plurality of pairs of NOR gate terminals, and a first plurality of interconnections in a first selected pattern between each of the switch terminals and corresponding ones of AND gate or NOR gate terminals, a second plurality of interconnections in a second selected pattern between each of the switch terminals and corresponding ones of AND gate or NOR gate terminals;

said connection board being removable and replaceable by a similar board having a different selected pattern of interconnections.

* * * * *

PO-1050
(5/69)

UNITED STATES PATENT OFFICE
CERTIFICATE OF CORRECTION

Patent No. 3,634,880            Dated January 11, 1972

Inventor(s) William J. Hawkins

It is certified that error appears in the above-identified patent and that said Letters Patent are hereby corrected as shown below:

Col. 5, line 42 - "lead" should be "code"

Col. 8, line 47 - "tempering" should be "tampering"

Signed and sealed this 4th day of July 1972.

(SEAL)
Attest:

EDWARD M. FLETCHER, JR.            ROBERT GOTTSCHALK
Attesting Officer                   Commissioner of Patents